Oct. 1, 1957    G. L. DEVENNE    2,808,271
PARKING DEVICE FOR MOTOR VEHICLES
Filed Jan. 27, 1954    3 Sheets-Sheet 1
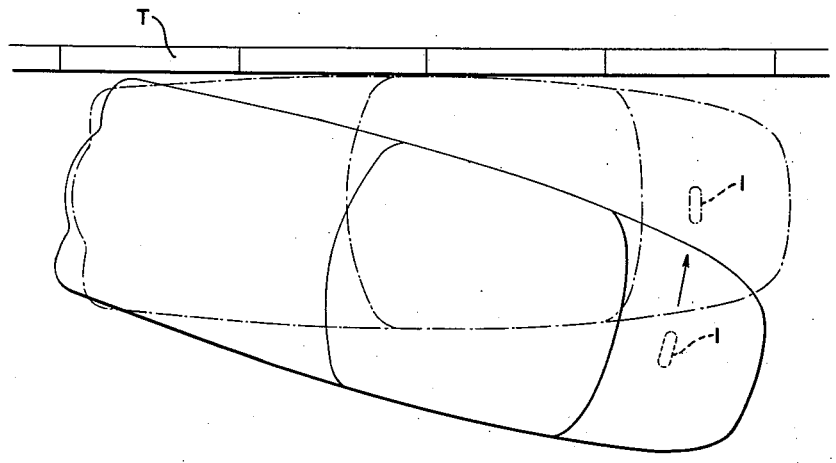
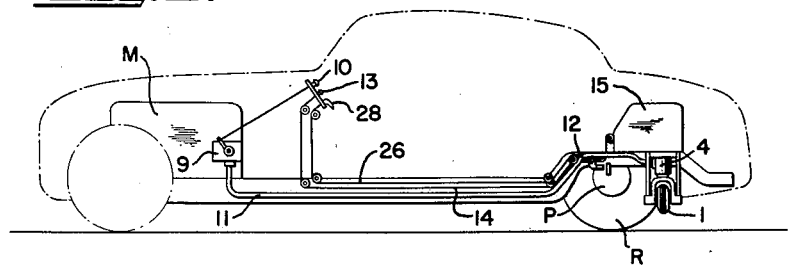
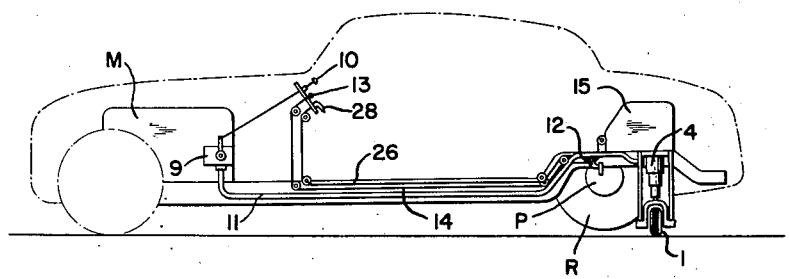
INVENTOR
GERARD LOUIS DEVENNE
BY
ATTORNEY

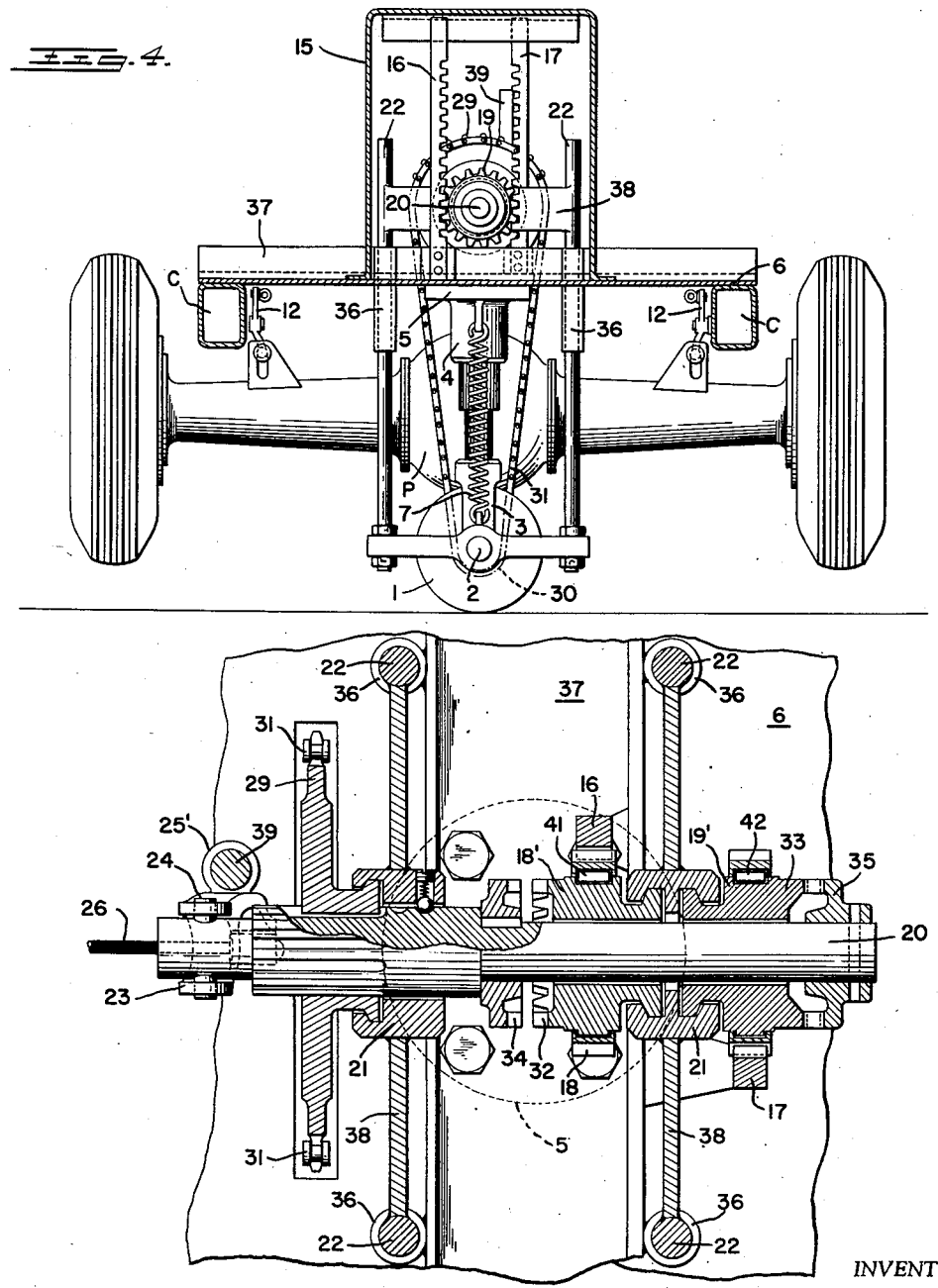

Oct. 1, 1957 G. L. DEVENNE 2,808,271
PARKING DEVICE FOR MOTOR VEHICLES
Filed Jan. 27, 1954 3 Sheets-Sheet 3
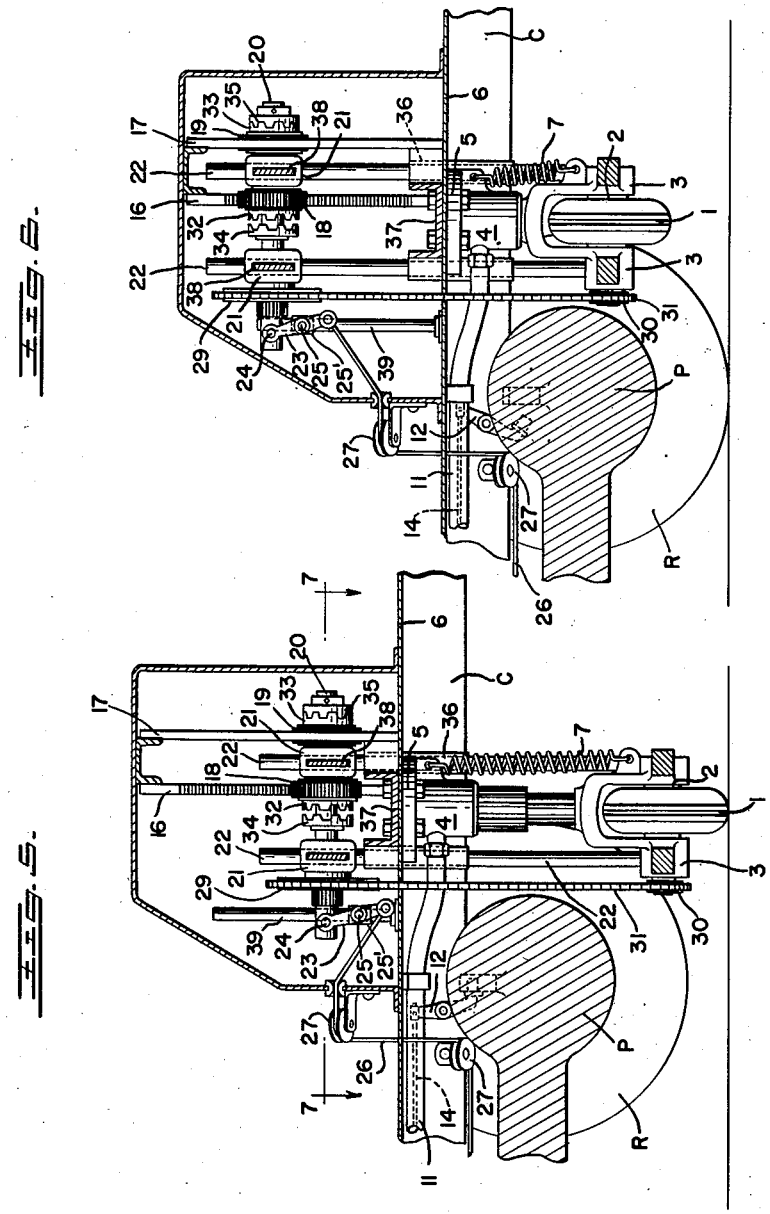
INVENTOR
GERARD LOUIS DEVENNE
BY
ATTORNEY United States Patent Office 2,808,271
Patented Oct. 1, 1957

2,808,271

PARKING DEVICE FOR MOTOR VEHICLES

Gerard L. Devenne, Washington, D. C.

Application January 27, 1954, Serial No. 406,493

Claims priority, application France February 3, 1953

4 Claims. (Cl. 280—150)

The present invention relates to a parking device for motor vehicles.

More particularly, the present invention relates to an auxiliary parking device for use with motor vehicles which utilizes an auxiliary wheel which is lowered by means of a hydraulic jack and which is operated by the weight of the vehicle to provide rotation thereof and to park the car in a predetermined position.

It is, accordingly, an object of the present invention to provide an auxiliary parking device which is simple in structure, inexpensive to manufacture, and reliable in its operation.

It is another object of the present invention to provide a parking device for motor vehicles which utilizes an auxiliary wheel which is driven through an appropriate drive and clutch mechanism by the weight of the vehicle.

It is another object of the present invention to provide a parking device for motor vehicles which is actuated by the weight of the vehicle itself.

It is another object of the present invention to provide a parking device which utilizes relatively few parts and which may be operated by relatively simple controls.

It is another object of the present invention to provide an auxiliary parking device for motor vehicles which permits an excellent utilization of the space in the rear end of the vehicle and which does not project under normal conditions beyond the vehicle body.

It is another object of the present invention to provide a parking device for motor vehicles which includes a simple and effective raising and lowering mechanism for the auxiliary wheel of the parking device.

These and other objects and advantages of the present invention will become more obvious from the following description when taken in connection with the accompanying drawing, which shows for purposes of illustration only one preferred embodiment in accordance with the present invention and wherein:

Figure 1 shows a plan view of the parking operation in connection with a motor vehicle along the curb of the road.

Figure 2 is a side view of a vehicle indicating the various parts of the parking device in accordance with the present invention in their respective positions with the vehicle underway.

Figure 3 is a view similar to Figure 2 showing the various parts thereof in their respective position during operation of the parking device.

Figure 4 is a rear view of the parking mechanism partially in cross section.

Figure 5 is a cross sectional side view of the mechanism shown in Figure 4 showing the various elements in their respective position during operation of the parking device.

Figure 6 is a side view similar to Figure 5 showing the various parts in their respective position with the vehicle underway and, Figure 7 is an enlarged cross sectional view along lines VII—VII of Figure 5.

Every driver knows the difficulty which one encounters with parking a vehicle along the curb between two vehicles which have been previously parked there.

In particular, when the space left free between the two vehicles is limited, then the parking operation requires often numerous maneuvers or attempts to back up the vehicle which become a tedious task and which furthermore impede the traffic and passage of other vehicles. The same applies when the vehicle thus parked is to depart from its parking space.

In order to remedy this inconvenience, it has been proposed for a long time to utilize the spare wheel to facilitate the parking maneuver in question by mounting the spare wheel at the rear end of the vehicle with its axle disposed following the longitudinal axis of the vehicle and by connecting it with a mechanism which permits lowering of the spare wheel until it makes contact with the ground, then continues its movement of descent until the rear wheels of the vehicle have left the ground, after which the vehicle is pivoted about its forward axle assembly or wheels which remain in contact with the ground throughout. The pivotal movement is obtained by rotating the spare wheel with the aid of an auxiliary motor which is provided in the aforementioned mechanism or by connecting an appropriate transmission to the engine of the vehicle itself.

This solution, while it permits the execution of the parking maneuver with very great ease, comprises, in contradistinction, various inconveniences, a few of which are as follows.

It involves a mechanical assembly which is costly and bulky and which must be placed in the rear trunk compartment or underneath the rear seat and which consequently reduces to a very important extent the capacity of the trunk compartment for the baggage.

Such auxiliary parking device becomes unavailable in the case of a tire blowout by reason of which the driver is obligated to make use of the spare wheel and where he would find a necessity to park his vehicle before he could have the damaged tire repaired.

Such auxiliary parking device requires in most cases an auxiliary motor for rotation of the spare wheel, the actuation of which, if such motor is electric, with repeated parking maneuvers during the course of a day while travelling in the city, runs the risk of discharging the battery.

If the rotation of the parking wheel is hydraulically controlled, it is necessary to provide a hydraulic generator and to drive such generator either by an electric motor, in which case the aforementioned disadvantages apply, or by the motor of the vehicle in low gear which would give rise to mechanical complications.

It has also been proposed to mount an auxiliary small wheel at the rear end of the vehicle which is placed transversely thereto and which plays the same role as the spare wheel in the mechanism described above. This solution eliminates the inconvenience which is inherent in the utilization of the spare wheel but it also necessitates the use of a special motor to rotate the auxiliary little wheel which determines the pivotal movement of the vehicle around its front wheels.

The present invention has for its objective to provide an improved arrangement for parking automotive vehicles which does not present the inconveniences mentioned above and which comprises a small wheel mounted transversely in the rear of the vehicle to pivot the vehicle about its front wheels while parking, and essentially resides in the fact that the energy generated by the descent of the vehicle from its raised position to which it had been raised in order to lift its rear wheels above ground is used to control the rotation of the little wheel and to thereby produce the above described pivotal movement of the vehicle. In other words, the energy which is used to drive the auxiliary wheel is that which is provided by the physical displacement of the rear end of the vehicle from its raised position, during which the rear end of the vehicle rests on the auxiliary wheel, to its normal road position in which the rear wheels are in contact with the ground.

The invention is equally characterized by the arrangement of the lifting mechanisms and by the arrangement used to control the rotation of the small auxiliary wheel which comprises in combination a jack, preferably of the hydraulic type, to lift the rear end of the vehicle by supporting itself on the ground through the intermediary of the small auxiliary wheel, a device, such as, for example, one or a plurality of springs which assure that the auxiliary wheel is raised back to its position corresponding to the position with the vehicle underway after execution of the parking maneuver, a system of gear racks integral with the vehicle and moving up and down with the vehicle, gear wheels constantly meshing with the gear racks and mounted on a shaft by the intermediary of free wheeling devices, such as one-way free-wheeling devices, a set of coupling clutches mounted on the shaft and permitting to connect the same either with one or the other of the gear wheels which mesh with the gear rack, and finally a transmission connecting the gear shaft with the shaft on which the small wheel is fixedly mounted.

Referring now more particularly to the drawing wherein like reference numerals are used throughout the various views thereof to designate like parts, reference numeral 1 designates the small auxiliary wheel which is the member greatly facilitating the execution of the parking maneuver of a motor vehicle along a curb between two other vehicles parked therealong previously with relatively little space therebetween. The auxiliary wheel 1 is disposed transversely to the vehicle and is preferably but not necessarily provided with a pneumatic tire. The auxiliary wheel 1 is fixedly mounted on or keyed to a shaft 2 in any conventional manner which may turn freely in a bearing supporting yoke 3, which is carried by and fastened to the lower end of a hydraulic jack 4. The hydraulic jack 4 is fixed at its upper end to the floor 6 of the vehicle by means of a base plate 5. One or a plurality of springs 7 which are fastened at one end thereof to an extension of the floor 6 and which are fastened at the other end thereof to the yoke 3 tend to always bring back the auxiliary wheel 1 to its elevated position, that is to its position which it must occupy when the vehicle is underway as indicated in Figure 2.

As shown in Figure 1, in order to execute the parking of the vehicle along the curb T, it suffices to move the car during its forward movement obliquely until its right forward wheel is very close to or in contact with the curb, to lower the auxiliary wheel 1 by actuating the jack 4 until the rear wheels have left the ground, as shown in Figure 3, then rotate the auxiliary wheel 1 in a manner to produce pivotal movement of the vehicle along its front axle arrangement in the direction of the arrow shown in Figure 1, and finally to raise the auxiliary wheel to its position corresponding to the position with the vehicle underway, that is, until the rear wheels are again in contact with the ground.

Figure 1 represents the parking maneuver according to the present invention when the curb is located on the right. It is understood, however, that the parking arrangement in accordance with the present invention is equally suitable to carry out a parking maneuver against a curb which is located to the left of the vehicle. It is only necessary in that case to rotate the auxiliary wheel 1 in the opposite direction to produce the pivotal movement of the vehicle in a direction opposite to the arrow indicated in Figure 1.

In order to bring the motor vehicle out of its parked position at the time of departure, it is only necessary to carry out the same maneuver as used in parking the car in reverse by turning the auxiliary wheel in a direction opposite to that used during parking.

The mechanism, which underlies the present invention and which will be described in detail hereinafter, permits the execution of these diverse operations and the control of the rotation of the auxiliary wheel 1 in one or the other direction wtihout the aid of any auxiliary motor.

The moving force which is used to produce the rotation of the auxiliary wheel 1 is provided by the weight of the vehicle which acts on a mechanism described more fully hereinafter while the vehicle is lowered from its position shown in Figure 3 to that shown in Figure 2. Before describing the mechanism used to practice this control, at first the mechanism for raising the rear end of the vehicle will be described more fully.

The base plate 5 of the hydraulic jack 4 is fastened to the floor 6 of the vehicle substantially along the longitudinal axis thereof, behind and as close as possible to the rear axle. This offers the following advantages:

Since the rear axle is the lowest point of the vehicle, the jack 4 and the auxiliary wheel 1 are thus protected with the vehicle underway when they occupy the elevated positions indicated in Figure 2.

By failing to place the jack completely at the end of the vehicle, it is possible to obtain a greater elevation with a smaller distance traversed by the jack; the greater power necessary may be readily obtained by a hydraulic control without noticeable increase in the weight or bulkiness or space requirement.

The mechanism in accordance with the present invention thus forms no projection beyond the vehicle contour and thereby maintains its normal appearance without any particular difficulties.

In order to obtain the same angle of pivotal movement of the vehicle, a smaller number of rotations of the auxiliary wheel 1 is necessary.

The control mechanism which is protected by an impervious body member may be located at the bottom of the trunk of the vehicle, the capacity of which is reduced thereby only by a very small measure.

The hydraulic jack 4 is of the telescopic type and thereby presents a minimum encumbrance in its raised position shown in Figure 2. The operation of the jack is effected by a hydraulic pump 9 which is actuated by motor M of the vehicle and which may be put into operation by the driver without leaving his seat by manipulating handle 10 which is provided on the dashboard of the vehicle. The pump 9 is connected with the hydraulic jack 4 by a hydraulic line system 11.

In order to obtain a sufficient rotation of the auxiliary wheel 1 to execute the parking maneuver during the lowering of the vehicle to its normal running position, the vehicle must traverse a certain distance during its descent. This condition is made possible without any excessive lifting of the vehicle in the first part of the maneuver by locking preliminarily the rear axle P, the rear wheels R and the suspension, not illustrated, to the chassis C of the vehicle. This locking is rendered possible by an arrangement which is indicated only schematically by reference numeral 12 and which is controlled from the dash board by means of a handle 13 which is connected with the lock by any appropriate transmission 14. The control arrangement of the locking mechanism is provided with appropriate play to take into account the very different loads of the vehicle.

The spring 7 insures a complete lifting of the auxiliary wheel 1 and of the jack assembly 4 after the rear wheels R of the vehicle are again in contact with the ground; the brusque action of the springs, which would ordinarily obtain during lifting of the auxiliary wheel 1 and of the jack 4, may be controlled by any suitable brake system which in turn may be controlled by regulating the escape of the oil from the jack 4.

Next the mechanism will be described by means of which the lowering movement of the rear axle of the vehicle is transformed into rotational movement in one or the other direction of the auxiliary wheel 1.

Two gear racks 16 and 17 are located in an impervious housing or body 15 which may be provided in the trunk space of a vehicle. Gear racks 16 and 17 may be arranged vertically, and mesh at all times with coaxial pinion gears 18 and 19, respectively, which are both provided with one-way free-wheeling devices 41 and 42, which may be located, for example, between the gears 18 and 19 and the hubs or sleeves 18' and 19' associated therewith. The gear racks are fixedly secured to the vehicle and consequently move therewith when the vehicle is lifted by means of the jack 4 or when the vehicle is permitted to descend to its normal position.

In their descent, the gear racks 16 and 17 produce simultaneous rotation of corresponding pinion gears 18 and 19 and sleeves 18' and 19' by the operation of the one-way free-wheeling devices 41 and 42, effective to lock gears 18 and 19 with the sleeves 18' and 19' for common rotation therewith during the descent of the racks 16 and 17, while during their lifting movement, the one-way free-wheeling devices 41 and 42 disengage the sleeves 18' and 19' from pinion gears 18 and 19 respectively so that rotation of the pinion gears 18 and 19 during the upward movement of the gear racks 16 and 17 fails to rotate the sleeves 18' and 19'. The control of the pinions 18 and 19 by the gear racks 16 and 17 is made possible by the fact that the shaft 20 which carries the pinion gears rises at the same time as the gear racks descend.

The pinion gears 18 and 19 are rotatably mounted by means of their respective sleeves 18' and 19' on a shaft 20 which turns in bearings 21 which are rigidly connected with the guide rods 22 which are fastened at their lower end to the yoke member 3 of the auxiliary wheel 1. The shaft 20 may be displaced longitudinally in the direction of its axis under the control action which may be of any suitable nature such as indicated schematically in Figures 2, 3, 5, 6 and 7 and which comprises a lever 23 coupled with shaft 20 at 24, pivotally supported at 25 on a sleeve 25' and subjected to the action of a control rope 26 which passes over pulley 27 and terminates at a control handle 28, also located at the dashboard of the vehicle.

The shaft 20 is connected with shaft 2 of the auxiliary wheel by any suitable transmission, which is indicated in the illustrated embodiment for purposes of illustration only, by a sprocket wheel 29 which is affixed to shaft 20 for rotation therewith in any conventional manner as by a splining arrangement shown in particular in Figure 7, by a sprocket wheel 30 fixed to shaft 2 in any conventional manner and by a chain 31 connecting sprocket wheels 29 and 30.

In order to provide proper functioning of the mechanism and to permit the alternate use thereof at will, depending on the parking maneuver to be executed, so as to produce rotation of the auxiliary wheel 1 in one sense or the other, it is necessary to drive shaft 20 either by one or the other of the gear racks 16 and 17. Such alternate use is rendered possible by the present invention by a clutching arrangement illustrated in Figures 5 to 7. Each of the sleeves 17' and 18' of the pinions is integral with a clutch element 32 and 33 respectively, which cooperate with a corresponding element 34 and 35 fixed to shaft 20 in any conventional manner (Figure 7). Thus, when the shaft 20 is displaced axially by means of the control 26 either to the left or right as shown in Figure 7, either the clutch 32 and 34 or the clutch 33 and 35 is engaged thereby. In Figures 5 through 7 it is the right hand clutch 33 and 35 which is shown in its engaged position so that the pinion gear 19 is connected with the shaft 20. Consequently, when the vehicle is permitted to descend, the gear rack 17 rotates the pinion gear 19 which in turn rotates the shaft 20 through clutch members 33 and 35. Rotation of the shaft 20 is transmitted to the auxiliary wheel 1 by means of the transmission formed by elements 29, 30 and 31.

The vertical guiding of the movable elements is effected in the following manner: The rods 22 which carry the bearings for shaft 20 slide in sleeves 36 fixed to the floor 6 of the vehicle which is preferably reinforced as shown in Figures 5 to 7 by a U-shaped member 37 made of iron or steel and bolted to the floor 6. As seen in Figure 7, two rods 22 are each connected by linking plates 38 which are integral with the bearings 21. An assembly which is very strong and rigid is formed thereby which at the same time assures proper guidance and maintains constant spacing between the axes of the sprocket wheels 29 and 30.

On the other hand, the sleeve 25' which carries the pivotal support 25 of lever 23 which controls the longitudinal displacement of the shaft 20 slides along a tube 39 which is affixed to the floor 6.

*Operation*

The operation of the device described above may be summarized as follows:

In order to carry out the parking maneuver of the vehicle along the curb T (Figure 1), the driver drives the vehicle forwardly into the space provided until the front wheels are located alongside the curb T or are in contact therewith or almost in contact therewith, this operation being facilitated by the provision on the vehicle of small guide rods or feelers which vibrate in a known manner to announce sufficient closeness with the curb.

After having locked the axle P by using the handle 13, the driver actuates handle 10 to energize the hydraulic pump 9 which results in operating jack 4. Jack 4 descends until the auxiliary wheel 1 comes in contact with the ground while the pump continues to function whereby the jack lifts the rear end of the vehicle until the rear wheels R are at a sufficient distance from the ground. During this lifting or raising of the vehicle, the gear racks 16 and 17 are also lifted, while the shaft 20 is lowered simultaneously with wheel 1 with which it is fixedly linked by tubes or rods 22. However, the sleeves 18' and 19' of pinion gears 18 and 19 are not rotated during that relative movement by their corresponding gear racks by reason of the free wheeling devices which are so arranged as to provide free-wheeling therebetween.

The driver next operates handle 28 in order to place it in the position which corresponds to the desired parking maneuver to be executed, i. e., to provide pivotal movement of the vehicle around its front wheels either toward the right or left depending on whether the curb along which the vehicle is to be parked is located on the right or left. The manipulation of handle 28 either engages clutch 32 and 34 or clutch 33 and 35, and, consequently, connects shaft 20 either with pinion gear 18 or pinion gear 19, that is, with that one of the two pinion gears which turns the auxiliary wheel 1 in the desired direction.

It suffices next to open a valve permitting the oil of the jack to escape. The vehicle descends by its own weight until the rear wheels R are in contact with the ground, the descent being readily controlled in a simple manner by controlling the rate of escape of the oil from the jack.

During this descent the gear rack which corresponds to the pinion gear engaged by means of the clutch rotates the pinion gear and through the corresponding one-way free-wheeling device the corresponding pinion gear sleeve and consequently shaft 20. Shaft 20 rotates the sprocket wheel 29 which by means of chain 31 rotates sprocket wheel 30 which is mounted on shaft 20 of the wheel 1, and thereby rotates the same. The rotation of the auxiliary wheel 1 thereby produces the pivotal movement of the vehicle in the desired direction around its front axle before the vehicle reaches the parked position indicated in dotted lines in Figure 1. Finally, the spring 7 assures the total retraction of the jack 4 which returns to its position indicated in Figure 3.

In order to depart from its parked position, the driver executes the same maneuver as described above, with the only difference that he engages the other clutch whereby the auxiliary wheel 1 turns in opposite direction and the pivotal movement of the vehicle will also take place in the opposite direction from that indicated by the arrow in Figure 1 which permits the driver to depart by conveniently backing the car out of the parking location.

It is possible to obtain a displacement of sufficient amplitude without difficulty for the vehicle with gear racks having a moderate height so that the gear racks may be readily located in the bottom of the trunk of the vehicle. Furthermore, the desired result may also be enhanced by conveniently choosing the diameter of the wheel 1, those of sprocket wheels 29 and 30 and those of pinion gears 18 and 19, finally, within limits of resistance, by selecting the shape of the teeth, such as pitch, etc., to produce the most favorable conditions.

In general, the functioning of the present invention is aided during its parking maneuver by the road which ordinarily slopes toward the curb. In connection therewith, the retention of the vehicle by controlling the escape of the oil from the jack constitutes a valuable asset and provides for reliability and security in the operation thereof.

It is well understood that the above described details of one preferred embodiment are only for purposes of illustration and that they may be modified in different ways and that certain parts may be replaced by equivalent elements without changing the scope of the present invention. It is thus possible that the necessity for the initial maneuver which consists in rendering the vehicle integral with the rear axle may be dispensed with by fixing the mechanism to the rear axle rather than to the floor of the vehicle. This solution entails a slight increase in the non-suspended weight but it may offer advantages in certain cases.

It is also noteworthy that the above-described mechanism offers to the driver the advantage of providing a permanent installation of a jack which is always in place to change the rear wheels. For such utilization, it is advisable with certain types of bodies having enveloping wheel guards to refrain from preliminary locking the car frame and the real axle in order to let the wheels fall back. With a view to the further utilization of the jack, it may be necessary to provide therefor an appropriate course of action.

I claim:

1. A parking device for motor vehicles comprising an auxiliary wheel located at one end of the vehicle and rotatably supported about an axis extending substantially in the longitudinal direction of the vehicle, jack means in said vehicle for lowering said auxiliary wheel relative to said vehicle to raise said one end of said vehicle out of engagement with the ground, an actuating means operated by the potential energy gained by said one end of the vehicle during the lowering of said auxiliary wheel by said jack means to rotate said auxiliary wheel, said actuating means comprising two elements in engagement with one another consisting of gear rack means and pinion gear means, one of said elements consisting of said gear rack means and pinion gear means being connected to said auxiliary wheel and the other of said elements being connected to said vehicle for respective common movement therewith to translate the down movement of said one end of the vehicle relative to said auxiliary wheel into rotary movement of said auxiliary wheel, and drive means connected between said auxiliary wheel and said pinion gear means for driving said auxiliary wheel upon rotation of said pinion gear means.

2. A parking device for motor vehicles comprising an auxiliary wheel located near one end of the vehicle and movable relative to said vehicle in the vertical direction, hydraulic means in said vehicle for moving said auxiliary wheel relative to said vehicle to thereby lift said one end and to store potential energy in the vehicle by the weight thereof being thus lifted; and means for pivotally moving said one end substantially about the other end of said vehicle to park the same including drive means for rotating said auxiliary wheel by said potential energy, said drive means having two mutually engaging elements connected to said vehicle and said auxiliary wheel respectively, and means for translating the relative movement in one direction only between said vehicle and said auxiliary wheel into rotary movement of said auxiliary wheel.

3. A parking device according to claim 2, wherein said drive means includes clutch means for reversing the direction of rotation of said auxiliary wheel.

4. A parking device for motor vehicles comprising an auxiliary wheel located near one end of the vehicle and mounted for rotation about an axis essentially parallel to the longitudinal axis of the vehicle, means in said vehicle for moving said auxiliary wheel relative to said vehicle to thereby lift said one end of the vehicle and store potential energy in the vehicle by the weight thereof thus lifted, and means for parking said vehicle by moving said one end about the other end of the vehicle including mechanical drive means connected between said one end and said auxiliary wheel to convert said potential energy into kinetic energy and to thereby drive said auxiliary wheel about said axis by said kinetic energy upon lowering said lifted one end.

References Cited in the file of this patent
UNITED STATES PATENTS

| | | |
|---|---|---|
| 1,441,419 | Hart | Jan. 9, 1923 |
| 1,574,517 | Rohdiek | Feb. 23, 1926 |
| 1,692,578 | Rystedt | Nov. 20, 1928 |
| 2,062,830 | Sabaeff | Dec. 1, 1936 |
| 2,091,326 | Mardovin | Aug. 31, 1937 |
| 2,136,570 | Walker | Nov. 15, 1938 |